UNITED STATES PATENT OFFICE.

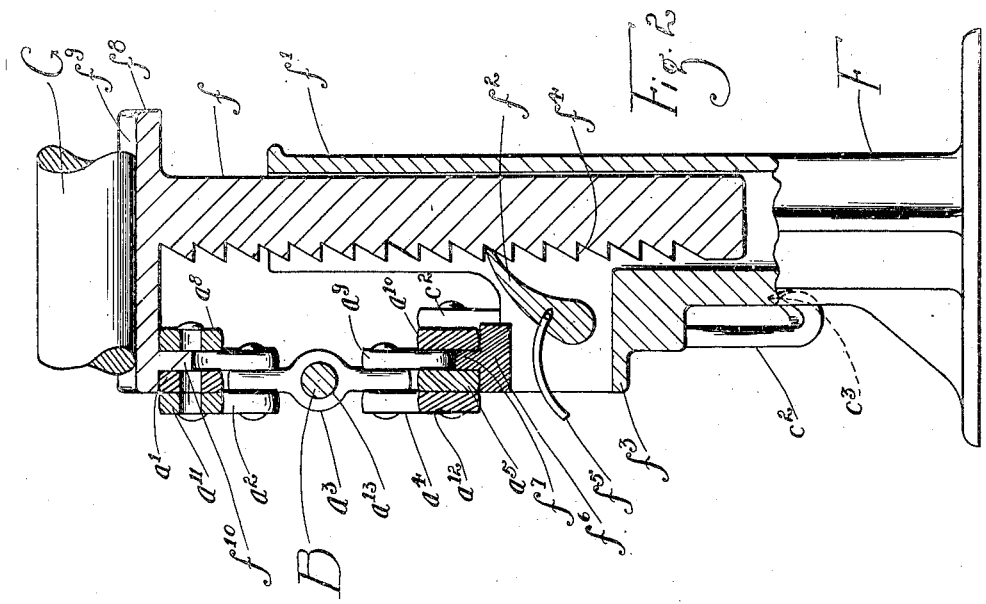
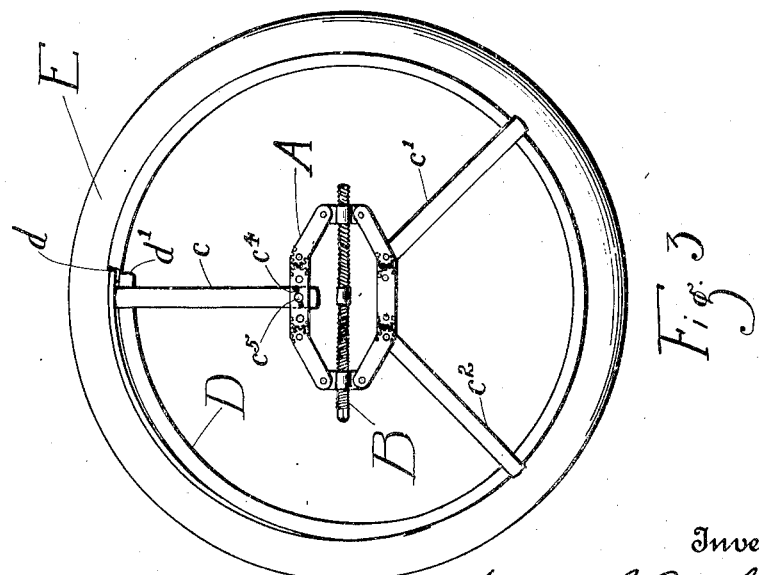

HARRY L. COOK, OF CINCINNATI, OHIO.

LIFTING JACK.

1,410,377.   Specification of Letters Patent.   Patented Mar. 21, 1922.

Application filed January 10, 1920. Serial No. 350,618.

*To all whom it may concern:*

Be it known that I, HARRY L. COOK, a citizen of the United States of America, and a resident of Cincinnati, in the county of Hamilton and State of Ohio, have invented a new and useful Improvement in Lifting Jacks, of which the following is a specification.

To my knowledge, there is no combined rim expander, rim contractor, and jack. My invention is of such a device. Heretofore two instruments have been required to change a tire on a mounted rim, one for jacking up the automobile and one for contracting and expanding the rim. The object attained through my invention is the combination in one device of the functions of one each of such instruments, in such manner that the same elements are operative in performing the common end, that heretofore has been partially performed by each of two such instruments, both such instruments comprising widely differing elements. By means of such combination there is a decided saving of space and weight, both items of great value to the motorist; also the autoist is not obliged to sprawl upon the ground while operating the jack.

In the accompanying drawings,

Fig. 2 is a sectional view on line 2—2 of Fig. 1; and

Fig. 3 is a front view of my invention, operative as a rim contractor.

Figure 1:
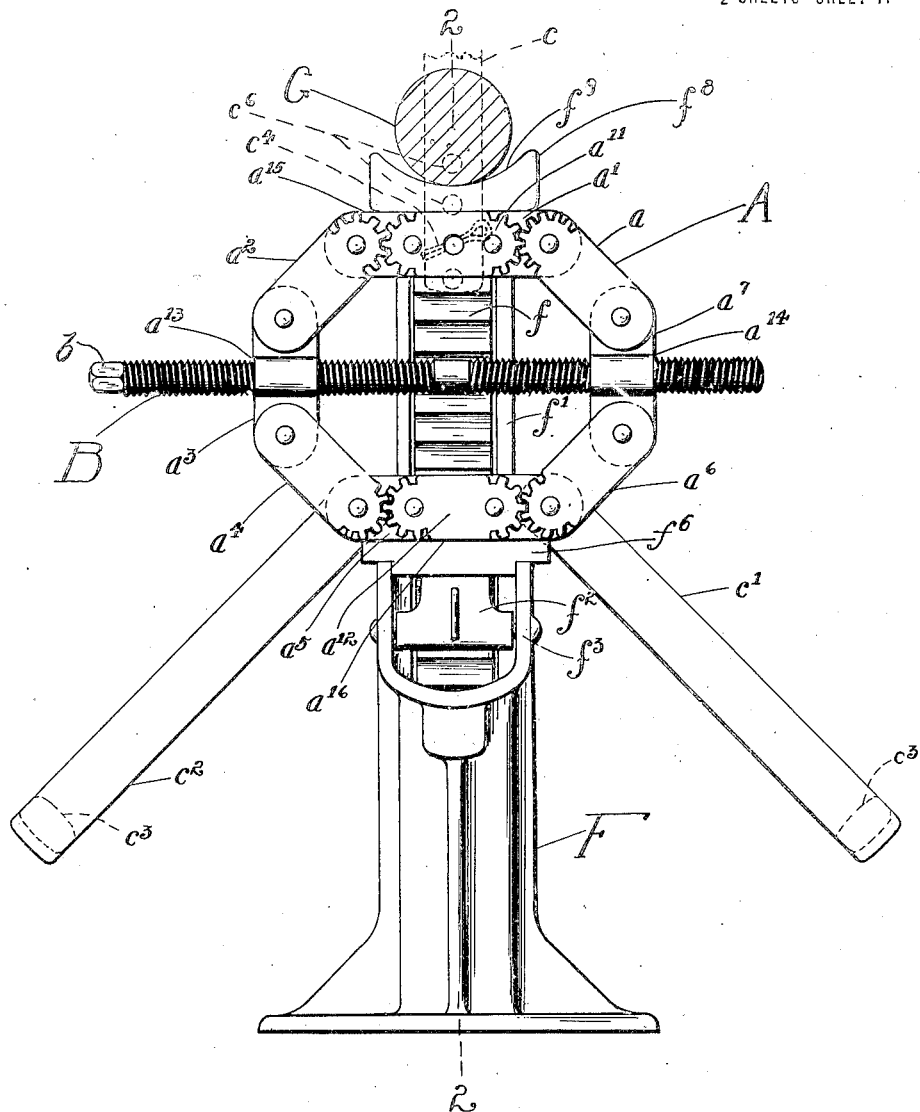
Figure 1 is a front view of my invention, operative as a jack.

My invention comprises a series of pivotally connected links forming a continuous body. A screw-bar, on one end of which is formed a right-hand thread and on the other end a left-hand thread, connects two opposite links of this continuous body. Extending from several of these links are arms adapted to engage an automobile rim. The links are in such relation that they will engage the seats formed on a jack. By turning the screw-bar, the jack or the rim-contractor, as the case may be, is operated.

The actuating frame A is formed of the continuous series of links $a, a^1, a^2, a^3, a^4, a^5, a^6, a^7, a^8, a^9,$ and $a^{10}$. On link $a^1$ is attached a plate $a^{11}$, having teeth formed on its ends. In the same way a similar plate, $a^{12}$, is attached to link $a^5$. Links $a$ and $a^2$ at their ends of contact with link $a^1$ have teeth formed in such ends so as to mesh with the teeth on plate $a^{11}$. In the same way the links $a^4$ and $a^6$ have teeth meshing with teeth on plate $a^{12}$. The links $a^3$ and $a^7$ have threaded ways $a^{13}$ and $a^{14}$ respectively, formed in them, one of said threads being right-handed and the thread in the other link being left-handed. A screw-bar B is fitted into these threaded ways, with the result that if the screw-bar is turned, the links $a^3$ and $a^7$ are either drawn together or forced apart, depending on the direction in which the force moves.

The upper and outer edge $a^{15}$ of links $a^1$ and $a^8$ and plate $a^{11}$ is parallel with the lower and outer edge $a^{16}$ of links $a^5$ and $a^{10}$ and plate $a^{12}$. The operations of the gear teeth referred to before and of the screw-bar B upon the links $a^3$ and $a^7$ will keep the edges $a^{15}$ and $a^{16}$ parallel at all times.

To this series of links are affixed the arms $c, c^1$ and $c^2$. At the outer ends of these are formed fingers or hooks $c^3$ adapted to engage an automobile rim. When these fingers grasp a rim and are then drawn together by the turning of screw-bar B, the rim D is contracted until end $d^1$ will pass beyond end $d$ and then the tire E can easily be removed from the rim. When a tire is then placed over this rim, the arms may be drawn closer together until the device will fit inside the contracted rim, then by reversing the movement of screw-bar B the rim can be expanded until edges $d$ and $d^1$ contact fixedly and the tire is again firmly seated on the rim.

The jack-section F comprises a ratchet bar $f$ enclosed in a casing or housing $f^1$ and held by a pawl $f^2$, hingedly supported in the bracket $f^3$ of the casing $f^1$, and engaging the notches $f^4$ on the ratchet-bar $f$. The pawl $f^2$ can be unseated from notches $f^4$ by means of lever $f^5$. A seat $f^6$ having a flange $f^7$ is mounted on the bracket $f^3$, the flange being adapted to be inserted between links $a^5$ and $a^{10}$ of the operating frame A. On the external or upper end of ratchet bar $f$ is a seat $f^8$, having a concave face $f^9$ adapted to seat an automobile axle G.

The seat of $f^8$ extends from the body of ratchet-bar $f$ over the bracket $f^3$ so that the flange $f^{10}$ on the under side of $f^8$ is in vertical alinement with flange $f^7$. Flange $f^{10}$ is adapted to be inserted between links $a^1$ and $a^8$. The arm $c$ is removable and when the operative frame A is to be used to jack up the machine axle, arm $c$ is disconnected by removing pin $c^4$ and then withdrawing bolt $c^5$, after which the arm can be withdrawn from between links $a^1$ and $a^8$. A series of apertures $c^6$ through any of which the bolt $c^5$ will pass, permit the rim expander and contractor to be varied to accommodate any size rim. The one end of screw-bar B has a square head $b$ permitting the bar to be operated by a brace having a long shank, a wrench, or any similar tool.

From this description it will be seen that I have invented a combined rim expander and contractor and jack which is of an extremely simple nature. All the elements embodied in any other jack, that are subject to jamming or slipping, are eliminated.

When a tire is to be changed the jack is placed under the axle, the actuating frame is seated between seats $f^6$ and $f^8$ and retained in position by means of flanges $f^7$ and $f^{10}$. The frame is then expanded. When the axle has been raised so that the tire no longer contacts the ground, the actuating frame is contracted so as to disengage it from the jack, the pawl supporting the ratchet bar and consequently the axle, and arm $c$ is attached to the frame. The device is then expanded to such extent that the fingers $c^3$ will grasp the edge of the rim after the rim has been removed from the wheel base. The finger on arm $c$ is set upon the rim in immediate proximity to the end $d$ of the rim. Then the frame is contracted until edges $d$ and $d^1$ are no longer in contact, after which the tire is easily removed. A tire is then placed on the rim and the frame is disengaged from the rim. The frame is then contracted until the arms of the device can be seated within the rim. The frame is then expanded until edges $d$ and $d^1$ of the rim are again in the same relation as at the time the rim was removed from the wheel base. The rim is mounted on the wheel base after disengaging the frame. The frame is then seated on the jack as before removing therefrom. The frame is expanded until the pawl can be disengaged from the ratchet-bar, after which, the frame is contracted until the tire again rests on the ground, when the jack and frame are removed and the motorist is able to resume his way.

Having thus described my invention, what I claim is:—

1. As a new article of manufacture, an actuating frame, to be utilized in expanding, contracting, raising and lowering processes, comprising a continuous series of links, pivots connecting the links and gear teeth formed on two opposite links, gear teeth formed on the links next adjacent the said two opposite links, the gear teeth of adjacent links intermeshing, and means for expanding and contracting the device and keeping the upper and lower links in parallelism.

2. As a new article of manufacture, an actuating frame, to be utilized in expanding, contracting, raising, and lowering processes, comprising a continuous series of links, pivots connecting the links and gear teeth formed on two opposite links, gear teeth formed on the links next adjacent the said two opposite links, the gear teeth of adjacent links intermeshing and a screw-bar connecting two opposite side links and adapted to reciprocate said side links and keep the upper and lower links in parallelism.

3. As a new article of manufacture, an actuating frame, to be utilized in expanding, contracting, raising and lowering processes, comprising a continuous series of links, pivots connecting the links, plates having gear teeth on each end affixed to two opposite links, teeth on the ends of the four next connected links meshing with the teeth on the plates, two each of the said four next connected links pivotally connected with two other opposing links, means to simultaneously reciprocate said last two opposing links in opposite directions in the same plane, and adapted to retain the outer edges of opposite links in parallelism.

4. As a new article of manufacture, an actuating frame to be utilized in expanding, contracting, raising and lowering processes, comprising a continuous series of links, pivots connecting the links, plates having gear teeth on each end, affixed to two opposite links, teeth on the ends of the four next connected links meshing with the teeth on the plates, two each of the said four next connected links pivotally connected with two other opposing links, a screw-bar connecting the two other opposing links and adapted to reciprocate said last-mentioned links in opposite directions in the same plane and keeping the two first-mentioned opposite links in parallelism.

5. As a new article of manufacture, an actuating frame to be utilized in expanding, contracting, raising and lowering processes, comprising a screw-bar having a left-hand and a right-hand threaded section, two opposite links of a continuous series of pivotally connected links mounted on said screw-bar and adapted to be reciprocated in opposite directions in the same plane, a link of said series being pivotally connected to each side of both ends of said first two links so that there will be four each of the second mentioned group of links in two parallel planes, the links in the first of said parallel planes having gear teeth formed on their ends farthest removed from the two first-mentioned opposite links, each link of the group in the second parallel plane being pivotally connected with and mounted between two parallel set of parallel links, each set joining two links of the group in said second of the parallel planes, and each set also joining, on a common external side, two links of the group in the first of the parallel planes, a plate, having teeth on its two extremities, affixed in the same plane with the group of links in the first-mentioned of the parallel planes, to each of two links of the two parallel sets of parallel links, said teeth being adapted to engage and mesh with the teeth on the links in the first of said parallel planes.

6. The combination with an expansion device comprising a continuous series of pivotally connecting links, means to move the links about their pivotal mountings and to retain the outer edges of opposite links parallel at all times, of a jack comprising a housing, a ratchet-bar, a pawl adapted to be moved in and out of engagement with said bar, and adapted to support a body after being lifted or raised by said device, the housing and the ratchet-bar being adapted to be moved apart by the expanding device.

7. The combination with an expansion device comprising a continuous series of pivotally connecting links, means to reciprocate the links and to retain the outer edges of opposite links parallel at all times, and of supporting means comprising a housing, a bracket formed on the housing, a seat upon the bracket, a flange upon said seat, a ratchet-bar supported in said housing, a seat upon the bar, a flange upon the bottom of said seat, said flange being in vertical alinement with the first-mentioned flange, said flanges and seats being adapted to accommodate the expansion device, and a pawl hingedly supported in said bracket and adapted to be moved in or out of engagement with the ratchet-bar.

8. The combination with an expansion device to be utilized in expanding, contracting, raising and lowering processes, comprising a continuous series of links, pivots connecting the links, plates having gear teeth on each end affixed to two opposite links, teeth on the ends of the four next connected links meshing with the teeth on the plates, two each of the said four next connected links pivotally connected with two other opposing links, means to simultaneously reciprocate said last two opposing links in opposite directions in the same plane, and adapted to retain the outer edges of opposite links in parallelism, of a jack comprising a housing, a ratchet-bar, a pawl adapted to be moved in and out of engagement with said bar, and adapted to support a body after being lifted or raised by said( device, the housing and the ratchet-bar being adapted to be moved apart by the expanding device.

9. In combination with an expansion device to be utilized in expanding, contracting, raising and lowering processes, a screw-bar having a left-hand and a right-hand threaded section, two opposite links of a continuous series of pivotally connected links mounted on said screw-bar and adapted to be reciprocated in opposite directions in the same plane, a link of said series being pivotally connected to each side of both ends of said first two links so that there will be four each of the second-mentioned group of links in two parallel planes, the links in the first of said parallel planes having gear teeth formed on their ends farthest removed from the two first-mentioned opposite links, each link of the group in the second parallel plane being pivotally connected with and mounted between two parallel sets of parallel links, each set joining two links of the group in said second of the parallel planes, and each set also joining, on a common external side, two links of the group in the first of the parallel planes, a plate, having teeth on its two extremities, affixed in the same plane with the group of links in the first-mentioned of the parallel planes, to each of two links of the two parallel sets of parallel links, said teeth being adapted to engage and mesh with the teeth on the links in the first of said parallel planes, a jack comprising a housing, a ratchet-bar, a pawl adapted to be moved in and out of engagement with said bar, and adapted to support a body after being lifted or raised by said device, the housing and the ratchet-bar being adapted to be moved apart by the expanding device.

10. In combination with an expansion device to be utilized in expanding, contracting, raising, and lowering processes, a screw-bar having a left-hand and a right-hand threaded section, two opposite links of a continuous series of pivotally connected links mounted on said screw-bar and adapted to be reciprocated in opposite directions in the same plane, a link of said series being pivotally connected to each side of both ends of said first two links so that there will be four each of the second-mentioned group of links in two parallel planes, the links in the first of said parallel planes having gear teeth formed on their ends farthest removed from the two first-mentioned opposite links, each link of the group in the second parallel plane being pivotally connected with and mounted between two parallel sets of parallel links, each set joining two links of the group in said second of the parallel planes, and each set also joining, on a common external side, two links of the group in the first of the parallel planes, a plate, having teeth on its two extremities, affixed in the same plane with the group of links in the first-mentioned of the parallel planes, to each of two links of the two parallel sets of parallel links, said teeth being adapted to engage and mesh with the teeth on the links in the first of said parallel planes, supporting means comprising a housing, a bracket formed on the housing, a seat upon the bracket, a flange upon said seat, a ratchet-bar supported in said housing, a seat upon the bar, a flange upon the bottom of said seat, said flange being in vertical alinement with the first-mentioned flange, said flanges and seats being adapted to accommodate the expansion device, and a pawl hingedly supported in said bracket and adapted to be moved in or out of engagement with the ratchet-bar.

In witness whereof, I have hereunto subscribed my name this 8th day of January, 1920.

HARRY L. COOK.